United States Patent [19]

Freeman

[11] Patent Number: 5,667,868
[45] Date of Patent: Sep. 16, 1997

[54] OUTER DOOR PANEL AND METHOD FOR MOLDING AND ATTACHING SAME

[75] Inventor: Richard Benjamin Freeman, Oxford, Mich.

[73] Assignee: The Budd Company, Troy, Mich.

[21] Appl. No.: 467,752

[22] Filed: Jun. 6, 1995

Related U.S. Application Data

[62] Division of Ser. No. 120,940, Sep. 14, 1993.

[51] Int. Cl.⁶ ........................................ B32B 7/00
[52] U.S. Cl. .................... 428/120; 49/501; 49/502; 296/39.1; 296/146.1; 296/146.5; 296/146.6; 296/146.7; 296/146.9; 296/191; 296/207; 428/31; 428/119; 428/138; 428/167
[58] Field of Search ................. 428/120, 119, 428/31, 138, 167; 296/191, 39.1, 202, 207, 146.1, 146.5, 146.6, 146.7, 146.9; 49/501, 503

[56] References Cited

U.S. PATENT DOCUMENTS

| | | | |
|---|---|---|---|
| 1,989,724 | 2/1935 | Villanyi | 425/398 |
| 2,198,069 | 4/1940 | Widman | 49/502 |
| 2,288,577 | 6/1942 | Trautvetter | 49/502 |
| 2,658,790 | 11/1953 | Fish et al. | 49/350 |
| 2,707,320 | 5/1955 | Fish | 49/502 |
| 2,797,129 | 6/1957 | Renno | 49/502 |
| 2,807,498 | 9/1957 | Nelson | 49/502 |
| 3,670,066 | 6/1972 | Valyi | 264/148 |
| 3,791,693 | 2/1974 | Hellriegel et al. | 49/503 |
| 3,909,919 | 10/1975 | Miyabayashi et al. | 29/521 |
| 3,936,090 | 2/1976 | Aya et al. | 49/502 |
| 4,306,381 | 12/1981 | Presto | 49/502 |
| 4,328,642 | 5/1982 | Presto | 49/502 |
| 4,339,408 | 7/1982 | Jenkins | 264/328.7 |
| 4,388,355 | 6/1983 | Ikemizu | 428/120 |
| 4,405,173 | 9/1983 | Piano | 49/381 |
| 4,411,103 | 10/1983 | Ohmura et al. | 49/502 |
| 4,411,466 | 10/1983 | Koike | 49/502 |
| 4,416,088 | 11/1983 | Feucht et al. | 49/502 |
| 4,512,240 | 4/1985 | Mahler et al. | 49/503 |
| 4,529,244 | 7/1985 | Zaydel | 296/191 |
| 4,603,894 | 8/1986 | Osenkowski | 296/152 |
| 4,606,148 | 8/1986 | Gandini | 49/502 |
| 4,648,208 | 3/1987 | Baldamus et al. | 49/502 |
| 4,651,470 | 3/1987 | Imura et al. | 49/502 |
| 4,711,052 | 12/1987 | Maeva | 49/502 |
| 4,785,585 | 11/1988 | Grier et al. | 49/502 |
| 4,810,444 | 3/1989 | Alberino et al. | 264/102 |
| 4,843,762 | 7/1989 | Grier et al. | 49/502 |

(List continued on next page.)

FOREIGN PATENT DOCUMENTS

| | | |
|---|---|---|
| 0057270 | 8/1982 | European Pat. Off. |
| 0128621 | 6/1984 | European Pat. Off. |
| 0146186 | 6/1985 | European Pat. Off. |
| 7324492 | 2/1975 | France . |
| 2543890 | 4/1983 | France . |
| 2574109 | 6/1986 | France . |
| 51-68666 | 6/1976 | Japan . |
| 57-151427 | 9/1982 | Japan . |
| 57-209439 | 12/1982 | Japan ................ 428/31 |
| 58-217331 | 12/1983 | Japan . |
| 58-221739 | 12/1983 | Japan ................ 428/31 |
| 59-146806 | 8/1984 | Japan . |
| 59-171714 | 9/1984 | Japan . |
| 8600543 | 10/1987 | Netherlands . |

*Primary Examiner*—Nasser Ahmad
*Attorney, Agent, or Firm*—Harness, Dickey & Pierce, P.L.C.

[57] ABSTRACT

A method of molding an outer body panel and attaching that outer panel to an inner supporting portion of a vehicle. The outer panel is made in a mold having a mold cavity and a plurality of passages extending outwardly from the cavity. During the molding process, ejector pins disposed within these passages are used to provide supplemental pressure within the mold cavity and prevent shrinkage. After the material within the mold has solidified, the mold is opened and the ejector pins are used to eject the outer panel from the mold. Locating members formed in the passages are used to locate and maintain the outer panel in a fixed relationship with respect to the inner supporting portion when they are assembled and bonded to one another.

10 Claims, 2 Drawing Sheets

U.S. PATENT DOCUMENTS

| | | | |
|---|---|---|---|
| 4,845,894 | 7/1989 | Herringshaw et al. | 49/502 |
| 4,861,407 | 8/1989 | Volkmann et al. | 156/272.8 |
| 4,945,682 | 8/1990 | Altman et al. | 49/502 |
| 5,033,236 | 7/1991 | Szerdahelyi et al. | 49/502 |
| 5,034,076 | 7/1991 | Masui et al. | 156/79 |
| 5,040,334 | 8/1991 | Dossin et al. | 49/502 |
| 5,083,832 | 1/1992 | Ohya | 49/502 |
| 5,090,158 | 2/1992 | Bertolini | 49/502 |
| 5,095,659 | 3/1992 | Benoit et al. | 49/502 |
| 5,130,071 | 7/1992 | Iseler et al. | 264/102 |
| 5,151,236 | 9/1992 | Azzara et al. | 264/257 |
| 5,254,304 | 10/1993 | Adachi et al. | 428/328.1 |
| 5,340,528 | 8/1994 | Machida et al. | 264/328.7 |
| 5,419,863 | 5/1995 | Henderson | 428/31 |

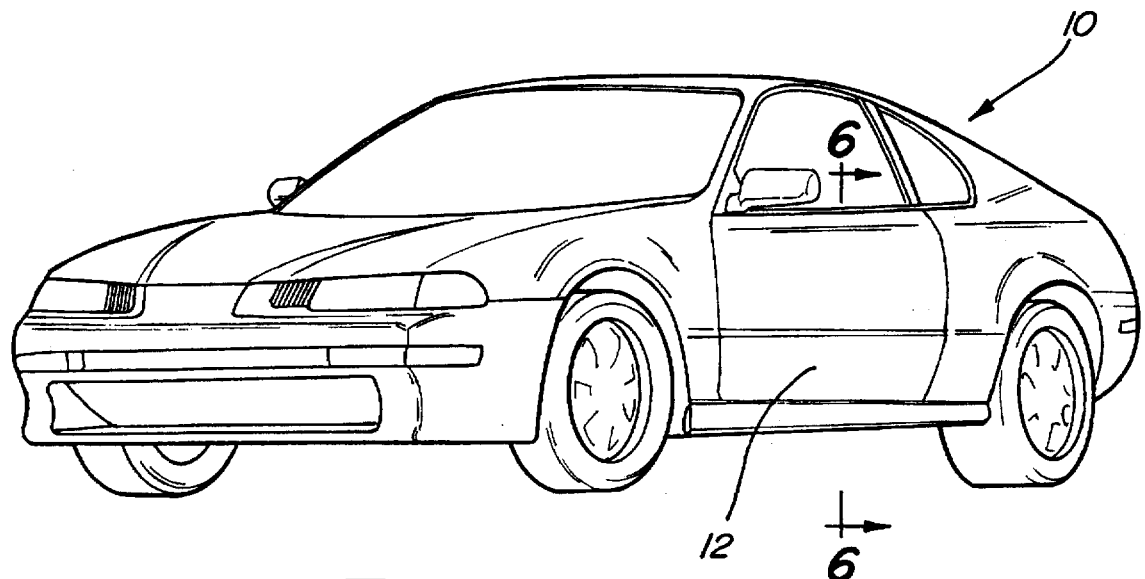
Fig-1
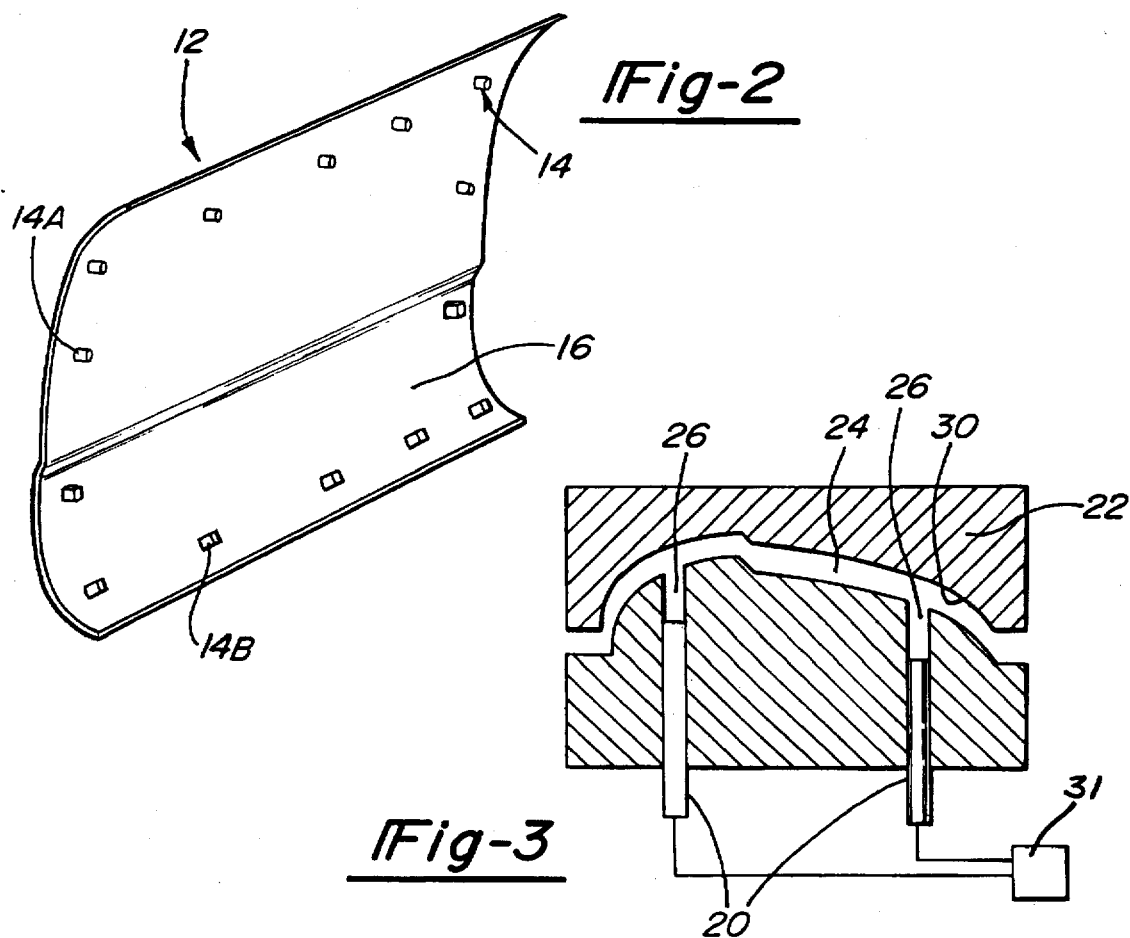
Fig-2
Fig-3

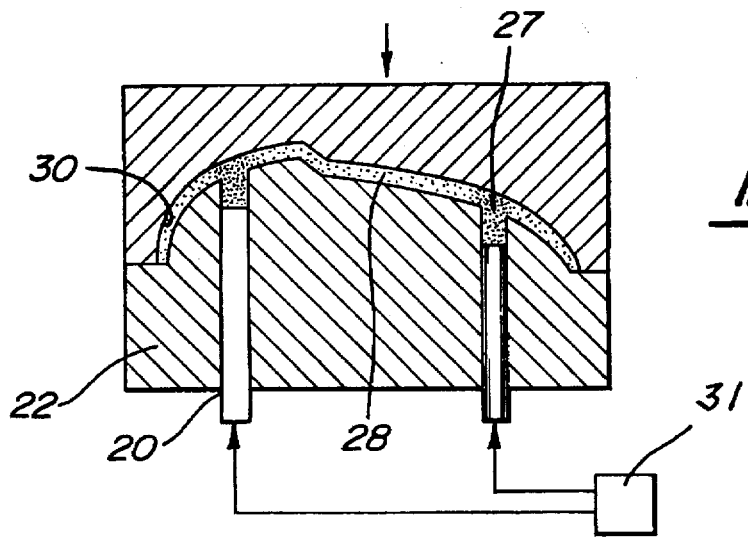
Fig-4
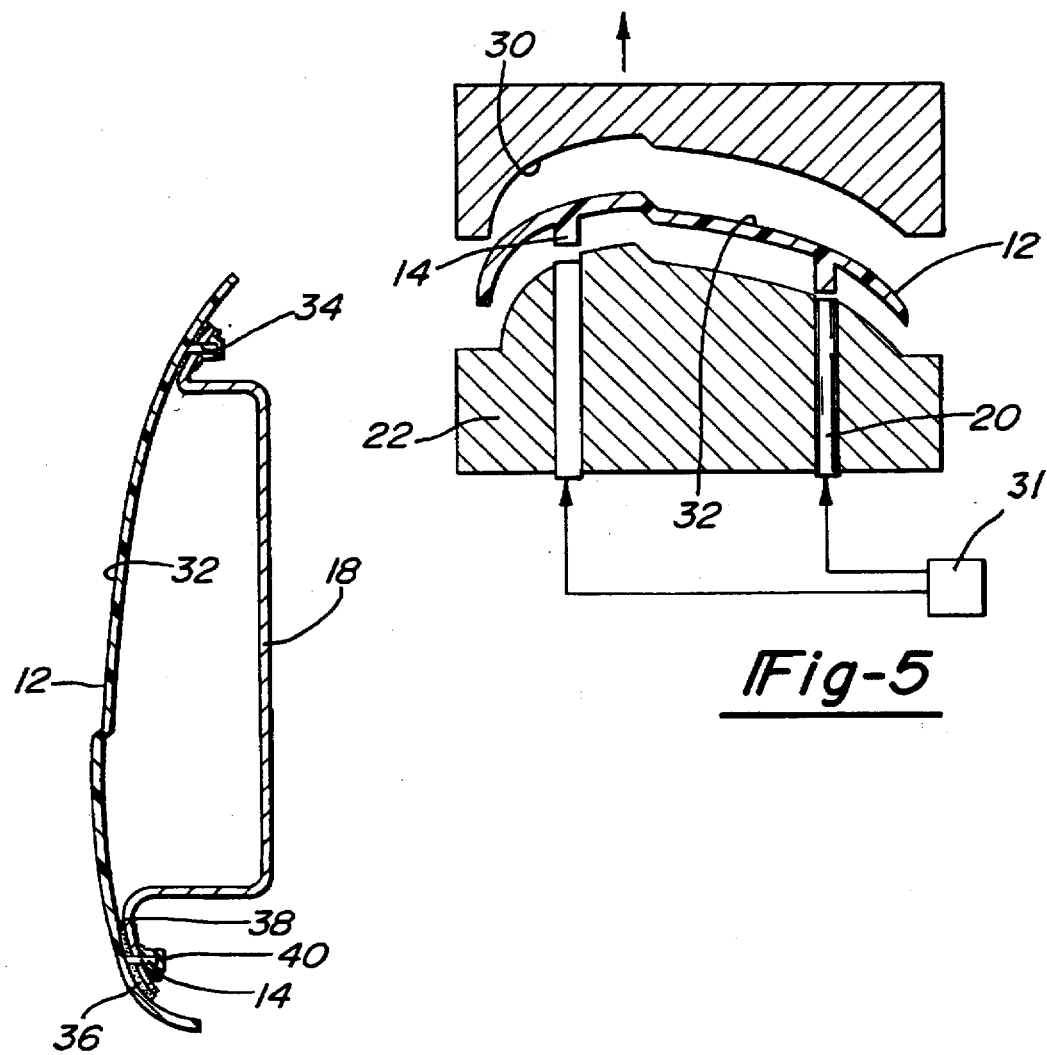
Fig-5
Fig-6

5,667,868

OUTER DOOR PANEL AND METHOD FOR MOLDING AND ATTACHING SAME

This is a division of U.S. patent application Ser. No. 08/120,940, filed Sep. 14, 1993 pending.

BACKGROUND OF THE INVENTION

1. Technical Field

This invention generally relates to automotive outer body panels and, more particularly, to a method of molding an outer body panel and attaching that outer body panel to the vehicle.

2. Discussion

In general, outer body panels for automotive vehicles are individually manufactured and subsequently attached to the vehicle. Outer body panels for automotive vehicles typically include the hood, liftgate, decklid, and door panels, which each have a number of unique manufacturing and assembly design parameters. These panels are sometimes molded from fiber reinforced plastic materials using compression molding techniques and, once molded, are eventually affixed to an adjacent inner portion of the vehicle. For example, a molded outer door panel is typically affixed to an inner door panel, and quite often utilizes mechanical fasteners or adhesives to aid attachment. One problem with using adhesives is that the outer door panel must be maintained at a proper orientation with respect to the inner door member while the adhesive sets up. Likewise, mechanical fasteners are often cumbersome and require additional parts and steps to properly orient and attach the panels during assembly. Moreover, the addition of mechanical fasteners to molded inner and outer panels can introduce small metallic parts to what otherwise might be an all plastic assembly. Thus, the ease of recycling what might otherwise be an all plastic assembly could be hindered by the use of such metallic parts.

SUMMARY OF THE INVENTION

The present invention provides a unique method of molding a novel outer body panel and attaching that outer panel to the vehicle. An outer body panel is formed in a mold having a mold cavity and passages extending outwardly from the mold cavity. The passages are used to form locating members in the form of posts, ribs or the like which project from the inner surface of the panel. During the molding process, the mold cavity, including the passages, are filled with a plastic moldable material. Ejector pins recessed in the passages are used to displace material in and around the passages, thereby creating a localized supplemental pressure within the mold cavity. By creating this supplemental pressure, shrinkage which could otherwise occur on the outer Class A surface of the panel, opposite the locating members, can be prevented. Moreover, after material remaining in the passages has solidified to form locating members, the ejector pins can also be used to bear on these integrally formed locating members to eject the outer panel from the mold. Thereafter, when the outer panel is affixed to the vehicle, these locating members are inserted into apertures within the adjacent inner portion of the vehicle to maintain the outer panel in a fixed relationship with respect to the vehicle as they are bonded to one another. Thus, the outer panel is readily molded without the associated shrinkage problems of an integrally formed locating member, and is attached to the vehicle without utilizing many of the conventional fastening techniques.

BRIEF DESCRIPTION OF THE DRAWINGS

Additional objects, advantages, and features of the present invention will become apparent from the following description and appended claims, taken in conjunction with the accompanying drawings in which:

FIG. 1 is a perspective view of a vehicle illustrating an outer door panel such as contemplated in the present invention;

FIG. 2 is a perspective view of an automotive outer door panel made in accordance with the principles of the present invention illustrating locating members integrally extending from an inner surface of the outer panel;

FIG. 3 is a diagrammatic cross sectional view of a mold for molding an outer door panel in accordance with the principles of the present invention;

FIG. 4 is a cross sectional view similar to FIG. 3 diagrammatically illustrating material within both the mold cavity and passages extending from the mold cavity and further illustrating the ejector pins moving forward in the passages such that an additional molding pressure is created within the mold cavity at a location adjacent to the passages;

FIG. 5 is a cross sectional view similar to FIGS. 3 and 4 diagrammatically illustrating the mold in an open position with the ejector pins being further moved in the mold passages effective to eject the outer panel from the mold in accordance with the principles of the present invention; and FIG. 6 is a cross sectional view taken along Section 6—6 in FIG. 1, diagrammatically illustrating the outer door panel bonded to a portion of the inner door member in accordance with the principles of the present invention;

DETAILED DESCRIPTION OF THE PREFERRED EMBODIMENT

Referring now to the drawings and, in particular, to FIG. 1, an automotive vehicle 10 is shown which has various outer body panels that are molded and attached to an inner supporting portion of the vehicle 10 in accordance with the principles of the present invention. Although the present invention can be applied to any number of outer body panels, for purposes of illustration, the features of the present invention set forth hereafter are shown being used in conjunction with an outer door panel 12. This particular outer door panel 12 is preferably molded by compression molding techniques. However, other techniques such as injection molding or the like can also be utilized. As best shown in FIG. 2, this outer panel 12 has a plurality of locating members 14 extending generally perpendicularly from the periphery of its inner surface 16. The locating members 14 are integrally molded into the outer door panel 12 during the molding process and preferably take the form of posts 14A or ribs 14B. As will be described in greater detail hereafter, these locating members 14 are used to locate the outer door panel 12 on an inner door panel 18, quite often a stamped metal panel, while simultaneously maintaining the outer panel 12 in a fixed relationship with respect to the inner door panel 18 as they are bonded to one another. Moreover, these locating members 14 are created as a result of a unique molding process whereby "ejector pins" 20 (see, e.g., FIGS. 3, 4 and 5) of a mold 22 are used not only for ejecting the finished outer floor panel 12 from the mold 22, but also for providing supplementary molding pressure at specific locations within the mold 22 where locating members 14 are to be formed.

As diagrammatically shown in FIGS. 3, 4 and 5, the process for molding the outer door panel 12 of the present invention involves utilizing a mold 22 defining a mold cavity 24. This cavity 24 includes a plurality of passages 26 extending outwardly therefrom for forming locating members 14. By also providing ejector pins 20 in these passages 26, supplementary pressure can be locally applied. This pressure is used to counteract shrinkage that may otherwise occur on the smooth exterior surface of the panel at locations 27 opposite the locating members 14.

In operation, the mold 22 is opened and fiber reinforced plastic material, preferably in the form of sheet molding compound (SMC) is placed on the surface of one of the dies. As is known in the art, the dies are conventionally heated. The opposite die is then moved toward the SMC material, thereby compressing it within the mold cavity 24. As shown in FIG. 4, the compression of the die forces SMC material into the passages 26 which ultimately forms the locating members 14. During the time that the mold is closed, the ejector pins are moved within the passages 26 to a position defining the desired length of the locating members. In addition, this movement of the ejector pins 20 causes a force to be applied on the material within passages 26 in a direction toward the exterior surface of the panel. The pins 20 thus provide back pressure against localized areas 27 opposite the locating members 14 which are being molded integrally with the major face of the panel. This back pressure from the ejector pins 20 serves to counteract shrinkage that may other, vise occur at locations 27 during curing of the molding compound.

The movement of the ejector pins 20 is controlled by various conventional means such as by the same hydraulic source 31 or the like which is typically used in a mold press to activate ejector pins. Thus, after the part has cured, the mold 22 is opened and the source 31 activated to move the ejector pins 20 against the integrally formed locator members 14, thereby pushing the panel 12 away from the die surface of the mold 22. Accordingly, the ejector pins 20 serve a dual purpose. First, to counteract for shrinkage that may be encountered as a result of integrally forming the locating members 14 and, secondly, to eject the finished part from the mold.

Once the outer door panel 12 has been molded, it is ready to be attached to an inner door panel 18 as shown in FIG. 6. In order to attach the outer panel 12 to the inner door panel 18, the locating members 14 are first inserted into apertures 34 within the inner door panel 18, thereby properly locating and orienting the outer door panel 12 with respect to the inner door panel 18. Preferably, before the locating members 14 are engaged with the apertures 34, an adhesive 36 is applied to either an outer surface 38 of the inner door panel 18 or an inner surface 16 of the outer door panel 12, or both. The outer door panel 12 is then bonded to the inner door member 18 when these surfaces 38 and 16 are brought into abutting engagement. Alternatively, an adhesive 36 can be injected between the inner and outer members 18 and 12 after the locating members 14 engage the apertures 34 and portions of the respective surfaces 16 and 38 abuttingly engage. Note, these surfaces 16 and 38 are preferably located adjacent to the locating members 14 and the apertures 34 respectively.

In any event, retaining members such as caps 40 can be attached to portions of the locating members 14 extending through the apertures 34 such that the outer panel 12 is maintained in a fixed relationship with respect to the inner door panel 18. Preferably, caps 40 are press fit over the distal end portion of the locating members 14 as shown in FIG. 6. However, other retaining members such as clips, nuts, pins or the like, may also be utilized to hold the outer panel 12 with respect to the inner door panel 18. The locating members 14 themselves may also be sized or shaped for a press fit engagement with the apertures 34 or for engagement with any type socket or the like within the inner door panel 18 that has been adapted to receive the locating members 14, thereby preventing the need for any type of retaining member. By maintaining a fixed relationship, portions of the outer door panel 12 and the inner door panel 18 can be brought into, and held in, abutting engagement with one another until the adhesive cures. As such, these portions of the inner and outer panels 18 and 12 can be accurately and consistently bonded to one another in proper alignment.

In short, the unique features of the present invention provide for a simplified mold design whereby ejector pins serve the dual purpose of providing back pressure to material within the mold during the molding process in areas prone to shrinkage and ejecting the part from the mold thereafter. In addition, the passages that house the ejector pins are also used to form a plurality of locating members that integrally extend from portions of the finished outer door panel. Thereafter, these locating members are used to locate and hold the outer door panel on the inner door panel as an adhesive is permitted to set up, thereby permanently bonding them to one another. Thus, three separate features involved in the molding and assembling of an outer door panel are now able to be accomplished by one simple design.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An exterior automotive outer body panel comprising:
   (a) a compression molded outer body panel formed of sheet molding compound so as to provide a smooth outer surface;
   (b) a plurality of integrally molded locating means extending generally perpendicular from and located along from the periphery of an inner surface of said outer body panel, said outer surface of said outer body panel which is opposite said integrally formed locating means being free of indentations;
   (c) an inner support having receiving means defined therein such that said locating means engage said receiving means to maintain said outer panel in a fixed relationship with respect to said inner support;
   (d) a plurality of retaining means engaging a portion of said locating means extending through said receiving means and
   (e) an adhesive permanently bonding said outer panel to said inner support while being maintained in said fixed relationship.

2. The automotive outer body panel as claimed in claim 1 wherein each of said retaining means is a cap member that is pressed on said locating means.

3. The automotive outer body panel as claimed in claim 1 wherein each of said locating means is an integrally molded post extending from said outer panel.

4. The automotive outer body panel as claimed in claim 1 wherein each of said locating means is an integrally molded rib extending from said outer panel.

5. The automotive outer body panel as claimed in claim 1 wherein a portion of said inner support adjacent said receiving means abuttingly engages a portion of said outer panel adjacent said locating means.

6. The automotive outer body panel as claimed in claim 1 wherein each of said receiving means is a socket aperture.

7. The automotive outer body panel as claimed in claim 6 wherein each of said locating means is an integrally molded post extending from said outer panel, shaped for a press fit engagement with said socket aperture.

8. The automotive outer body panel of claim 1 wherein said automotive outer body panel is a liftgate.

9. The automotive outer body door panel of claim 1 wherein said inner support is a stamped metal panel.

10. An exterior automotive outer body door panel comprising:

(a) a compression molded outer body door panel formed of sheet molding compound;

(b) a plurality of integrally molded locating posts extending generally perpendicular from and located along from the periphery of an inner surface of said outer body door panel, said outer surface of said outer body panel being a class A surface;

(c) an inner door support structure having a plurality of apertures positioned such that said plurality of integrally molded locating posts engage and extend through said plurality of apertures to maintain said molded outer body door panel in a fixed relationship with respect to said inner door support structure;

(d) an adhesive for bonding said outer body door panel to said inner door support structure while being maintained in a fixed relationship; and (e) a plurality of cap members which are pressed on said plurality of locating members extending through said plurality of apertures.

* * * * *